Jan. 16, 1962 M. J. HILLMAN ET AL 3,017,543

TRANSISTOR TIME DELAY RELAY CIRCUIT

Filed June 27, 1957

Murray J. Hillman
August Nuut
INVENTORS

BY Forest J. Lilly
ATTORNEY

United States Patent Office 3,017,543

Patented Jan. 16, 1962

3,017,543

TRANSISTOR TIME DELAY RELAY CIRCUIT

Murray J. Hillman, West Covina, and August Nuut, Glendale, Calif., assignors to Hycon Mfg. Company, Pasadena, Calif., a corporation of Delaware Filed June 27, 1957, Ser. No. 668,510

7 Claims. (Cl. 317—148.5)

The present invention relates generally to time delay circuits and more particularly to a transistor time delay relay circuit.

Time delay circuits are usually used to delay the application of power, for example, to a load of some kind after the actuation of a control element (such as a switch). This is desirable for various reasons, all serving to provide sufficient time for performance of some preliminary function incidental to the application of power to the load. The durations of time delay can vary considerably, depending upon the purpose of the delay, of course. There is only one main reason for resetting a time delay circuit, however, and that is to prepare it for another time delay operation. The cogent requisite is to accomplish this reset operation quickly and surely.

It is an object of this invention to provide a relay circuit which delays the application of power for a comparatively long time to a load, but which resets very quickly for another full delay operation upon any interruption of the supply power.

Another object is to provide a transistor time delay relay circuit in which the duration of time delay is determined principally by time constant elements that can be varied in value to obtain a wide range of delay time.

A further object of the invention is to provide a simple and effective transistor time delay relay circuit.

Briefly, the foregoing and other objects are preferably accomplished by providing a resistive-capacitive (R-C) time constant network which can be connected to a source of direct voltage on closure of a switch, for example, the voltage across the capacitance being applied to the input circuit of an emitter follower having a relay control coil connected in the emitter circuit. After a time delay determined principally by the values of the time constant network elements, te relay control coil is sufficiently energized to operate the relay. Energization and operation of the relay applies power to a load, the power and load being respectively connected to separate relay contacts which are joined by the relay armature on actuation of the relay.

The invention possesses other objects and features, some of which, together with the foregoing, will be set forth in the following detailed description of a preferred embodiment of the invention, and the invention will be more fully understood by reading the description with joint reference to the attached drawings, in which.

Figure 1:
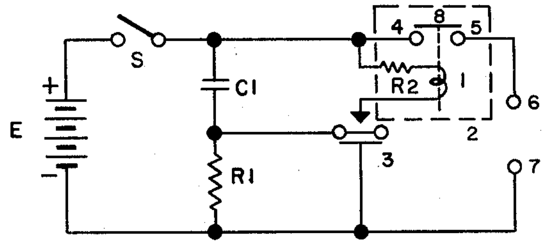
FIGURE 1 is a circuit diagram of a transistor time delay relay circuit of preferred construction.

A source of direct voltage E can be applied to the series combination of a capacitor C1 and resistor R1 through closure of a switch S, as shown in FIGURE 1. The control coil 1 of a relay 2 has an intrinsic coil resistance which is illustrated as a series resistor R2. The coil 1 (including series resistor R2) connects one side (connecting with the switch S) of capacitor C1 to the emitter of, for example, a p-n-p type junction transistor 3. The base of transistor 3 is connected directly to the common junction of capacitor C1 and resistor R1, and the collector is connected to the opposite end of resistor R1 and the negative terminal of voltage source E.

Contact 4 of relay 2 is connected to the common junction of switch S and capacitor C1, and the other contact 5 is connected directly to output terminal 6. The output terminal 7 is connected back to the negative terminal of the voltage source E. When relay coil 1 is sufficiently energized, armature 8 is actuated, connecting contact 4 and contact 5. Thus, a load connected between output terminals 6 and 7 is supplied by voltage source E when both switch S and relay 2 are operated (closed).

Component values yielding an approximate four-second delay circuit are listed below. While specific values and types of components are given, these have been noted as examples only, and are not intended to restrict the breadth and scope of the present invention.

| | |
|---|---|
| E | 28 volts. |
| 2 | North Elec. Co. IR226A. |
| 3 | Raytheon 2N63. |
| R1 | 39 kilohms. |
| R2 | 10 kilohms.[1] |
| C1 | 50 mfd. |

[1] Approximate coil resistance of relay 2.

Operation of the circuit of FIGURE 1 can be described with reference to FIGURES 2 and 3. The capacitor C1 is assumed completely discharged when switch S is closed at a time $t_0$. The instant that switch S is closed, the full voltage E is applied across resistor R1 since capacitor C1 is effectively a complete short then. This is indicated by the sharp initial rise in curve 9 at time $t_0$ in FIGURE 2. Curve 9 is a plot of the voltage across resistor R1, $V_{R1}$, versus time $t$.

Figure 2:
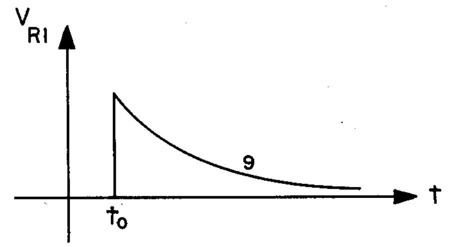
FIGURE 2 is a graph illustrating a plot of the voltage existing across a resistive time constant element versus time, following energization of the time constant network.
Figure 3:
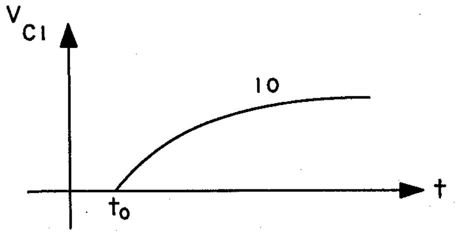
FIGURE 3 is a graph of a plot of the voltage existing across a capacitive time constant element versus time, following energization of the time constant network.

The capacitor C1, of course, immediately begins to charge exponentially as illustrated by curve 10 in FIGURE 3, as the voltage across R1 decays (curve 9, FIGURE 2). Curve 10 is a plot of voltage across capacitor C1, $V_{C1}$, versus time $t$. The control coil 1 is connected in the emitter circuit of the transistor 3 and not in the collector circuit, as would be normally expected. Further, the intrinsic resistance of the control coil 1 is relatively high, being of the order of 10,000 ohms, for example.

Since the base to emitter voltage is always very low (approximately .15 volt), the voltage across control coil 1 substantially equals that across capacitor C1 at all times. When capacitor C1 begins charging, the potential on the base of the transistor 3 starts approaching the collector voltage, and as the voltage across capacitor C1 increases, so does the voltage across control coil 1, together with the current through it. The connection of control coil 1 (resistor R2) in the emitter circuit additionally provides negative current feedback stabilization of emitter current vs. base voltage ($V_{C1}$), thereby making the relay pull-in point substantially independent of transistor characteristics.

The input resistance of an emitter follower is approximately equal to the sum of the emitter resistance and load resistance, both modified by the collector-to-base short circuit current amplification factor. Thus, $R_{in} \cong \alpha cb(r_e + R2)$. The emitter resistance $r_e$ is normally relatively small and the input resistance $R_{in}$ is hence heavily dependent on the (high) load resistance R2. Consequently, transistor 3 has a high input resistance and the values of capacitor C1 and resistor R1 effectively establish the charging time constant of the circuit. After a period of time determined principally by the values of capacitor C1 and resistor R1, therefore, the control coil 1 current equals and exceeds the required pull-in current such that armature 8 closes relay contacts 4 and 5 to apply power to a load connected between output terminals 5 and 6.

The time delay relay circuit can be reset by opening the switch S. Capacitor C1 then discharges through the coil resistance R2 and the emitter to base junction of transistor 3, de-energizing relay 2. Since the combined resistance of coil resistance R2 (about 10,000 ohms, for example) and the emitter to base junction resistance (about 300 ohms, for example) is much less than the value of resistor R1 (39,000 ohms, for example), the reset time is much less than the delay time. It should be noted that coil resistance R2 could well be much less than 10,000 ohms, for example, and the input resistance $R_{in}$ still be very high such that the charging time constant remains substantially dependent only on the values of resistor R1 and capacitor C1. The power gain of the transistor 3 allows use of much larger $R1/C1$ ratios to obtain any desired time delay. It is obvious that either resistor R1 or capacitor C1, or both, can be replaced by adjustable elements to obtain a variable output time delay circuit.

Figure 4:
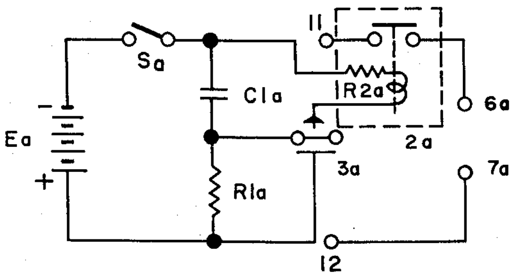
FIGURE 4 is a circuit diagram of another version of the transistor time delay relay circuit.

A transistor time delay relay circuit employing a type n-p-n junction transistor 3*a* is shown in FIGURE 4. The circuit is similar to that of FIGURE 1 except that a source of direct voltage E*a* of reverse polarity (to source E) is used with the n-p-n type transistor. Another minor difference is that relay 2*a*, when energized and operated, applies power from a separate power supply connected between terminals 11 and 12, to a load connected between output terminals 6*a* and 7*a*.

The operation of the circuit of FIGURE 4 is substantially identical to that of FIGURE 1, and is believed to require no detailed explanation in view of this similarity. However, where the value of resistor R1*a* is selected to be much smaller than that of the usual coil resistance R2*a*, for any particular value of capacitor C1*a*, the circuit functions to provide a time delay for the resetting operation, in contrast to a time delay at the beginning. This follows directly from the fact that the discharging time constant for C1*a*—R2*a* (including a relatively low emitter to base junction resistance) is much greater than the charging time constant for C1*a*—R1*a*.

It is to be understood that the particular embodiment of the invention described above and shown in the drawings is merely illustrative of and not restrictive of the broad invention, and that various changes in design, structure and arrangement may be made without departing from the spirit and scope of the broader of the appended claims.

What is claimed is:

1. A transistor time delay relay circuit, comprising: a source of direct voltage; a time constant network including a capacitor connected in series with a resistor; means for connecting and disconnecting said source of direct voltage across said network; a transistor emitter follower connected across said network and having an input connected across said capacitor for a variable input signal; and a relay having a control coil connected in said transistor emitter follower as an emitter load element, said relay being operatively responsive to a predetermined magnitude of said variable input signal, and said control coil being of relatively high resistance whereby a high input impedance is obtained for said transistor emitter follower when said network is connected to said source of direct voltage by said connecting means.

2. The invention according to claim 1 in which said resistor is of comparatively greater resistance than said relay control coil resistance, whereby a short reset time is obtained.

3. The invention according to claim 1 in which said resistor is of comparatively lower resistance than said relay control coil resistance, whereby a long reset time is obtained.

4. A transistor time delay relay circuit, comprising: a source of direct voltage; a time constant network including a capacitor connected in series with a resistor; means for connecting and disconnecting said source of direct voltage across said network; a transistor having a base, collector and emitter, the base of said transistor being connected to the common series junction end between said capacitor and said resistor, and the collector of said transistor being connected to the other end of said resistor; and a relay having a control coil connecting the emitter of said transistor to the other end of said capacitor, said relay being operatively responsive to a predetermined magnitude of the voltage across said capacitor providing a variable input signal to said transistor, and said control coil being of relatively high resistance whereby a high input impedance is obtained for said transistor when said network is connected to said source of direct voltage by said connecting means.

5. The invention according to claim 4 in which said resistor is of comparatively greater resistance than the resistance of said control coil, whereby a short reset time is obtained.

6. The invention according to claim 4 in which said resistor is of comparatively lower resisance than the resistance of said control coil, whereby a long reset time is obtained.

7. A transistor time delay circuit, comprising: a source of direct voltage; a time constant network including a capacitor connected in series with a resistor; means for connecting and disconnecting said source of direct voltage across said network; a transistor emitter follower connected across said network and having an input connected across said capacitor for a variable input signal; and a load connected in said transistor emitter follower as an emitter load element, said load being operatively responsive to a predetermined magnitude of said variable input signal.

References Cited in the file of this patent

UNITED STATES PATENTS

| | | |
|---|---|---|
| 1,592,613 | Meyer | July 13, 1926 |
| 2,567,928 | Farmer | Sept. 18, 1951 |
| 2,600,482 | Collis et al. | June 17, 1952 |
| 2,621,808 | Blakeney | Dec. 16, 1952 |
| 2,866,925 | Wunderman | Dec. 30, 1958 |
| 2,906,926 | Bauer | Sept. 29, 1959 |